United States Patent
Han et al.

(10) Patent No.: US 9,680,370 B2
(45) Date of Patent: Jun. 13, 2017

(54) POWER CONVERTING SYSTEM AND METHOD OF CONTROLLING THE SAME

(71) Applicants: Samsung SDI Co., Ltd., Yongin-si, Gyeonggi-do (KR); University Industry Liaison Office of CNU, Gwangju (KR)

(72) Inventors: Sangtaek Han, Yongin-si (KR); Jungpil Park, Yongin-si (KR); Sungjun Park, Gwangju (KR)

(73) Assignees: Samsung SDI Co., Ltd., Gyeonggi-do (KR); University Industry Liaison Office of CNU, Gwangju (KR)

( * ) Notice: Subject to any disclaimer, the term of this patent is extended or adjusted under 35 U.S.C. 154(b) by 78 days.

(21) Appl. No.: 14/712,720

(22) Filed: May 14, 2015

(65) Prior Publication Data

US 2016/0043625 A1 Feb. 11, 2016

(30) Foreign Application Priority Data

Aug. 8, 2014 (KR) .................... 10-2014-0102617

(51) Int. Cl.
*H02M 3/156* (2006.01)
*H02M 3/04* (2006.01)
(Continued)

(52) U.S. Cl.
CPC ............... *H02M 3/04* (2013.01); *H02J 3/38* (2013.01); *H02M 7/08* (2013.01);
(Continued)

(58) Field of Classification Search
CPC ............ H02M 3/1584; H02M 3/285; H02M 3/33561; H02M 3/33507; H02M 3/315;
(Continued)

(56) References Cited

U.S. PATENT DOCUMENTS 4,648,020 A * 3/1987 Vinciarelli ............ H02M 3/285
323/272
5,047,909 A * 9/1991 Hosoda .................. H02P 27/06
318/806
(Continued)

FOREIGN PATENT DOCUMENTS

| JP | 2006-211815 A | 8/2006 |
|---|---|---|
| JP | 2011-259686 A | 12/2011 |
| KR | 10-2013-0014395 A | 2/2013 |
| KR | 10-2013-0020397 A | 2/2013 |
| KR | 10-2013-00657338 A | 6/2013 |

OTHER PUBLICATIONS

Borghetti et al., "Maximum Efficiency Point Tracking for Adjustable-Speed Small Hydro Power Plant," *16th PSCC*, Glasgow, Scotland, Jul. 14-18, 2008, pp. 1-7.

*Primary Examiner* — Adolf Berhane
(74) *Attorney, Agent, or Firm* — Knobbe Martens Olson & Bear LLP

(57) ABSTRACT

A power converting system and method of controlling the same disclosed. In one aspect, the power converting system includes first and second power converters electrically connected to each other, a current controller configured to determine first and second efficiencies of the power converting system, modify an amount of a first current configured to flow into the first power converter and an amount of a second current configured to flow into the second power converter in one of a first mode and a second mode, compare the first efficiency to the second efficiency, and determine the first mode or the second mode as a current adjustment mode based at least in part on the comparison result. The power converting system also includes a current distributor configured to distribute the amounts of the first and second currents based at least in part on the determined current adjustment mode.

21 Claims, 4 Drawing Sheets

(51) Int. Cl.
*H02M 7/08* (2006.01)
*H02J 3/38* (2006.01)
*H02M 1/00* (2006.01)

(52) U.S. Cl.
CPC ............... *H02M 2001/0012* (2013.01); *H02M 2001/0048* (2013.01); *Y02B 70/1491* (2013.01)

(58) Field of Classification Search
CPC ........ H02M 3/335; H02M 7/10; H02M 7/153; H02M 7/08; H02M 7/17; H02M 7/217; H02M 7/515; H02M 7/757; H02M 1/088; H02M 3/156
USPC ... 363/65, 67, 68, 69, 70, 71, 84, 95, 97, 79
See application file for complete search history.

(56) References Cited

U.S. PATENT DOCUMENTS

| | | | |
|---|---|---|---|
| 7,566,988 B2 * | 7/2009 | Heber | H02J 9/062 307/44 |
| 9,112,411 B2 * | 8/2015 | Chae | G05F 1/46 |
| 2006/0164050 A1 | 7/2006 | Hasegawa et al. | |
| 2011/0298439 A1 | 12/2011 | Ng et al. | |
| 2013/0027997 A1 | 1/2013 | Tan et al. | |
| 2013/0286698 A1 * | 10/2013 | Lee | H02M 3/33507 363/71 |

* cited by examiner

POWER CONVERTING SYSTEM AND METHOD OF CONTROLLING THE SAME

CROSS-REFERENCE TO RELATED APPLICATIONS

This application claims the benefit of Korean Patent Application No. 10-2014-0102617, filed on Aug. 8, 2014, in the Korean Intellectual Property Office, the disclosure of which is incorporated herein in its entirety by reference.

BACKGROUND

Field

The described technology generally relates to power converting systems and methods of controlling the power converting systems.

Description of the Related Technology

Recently, demand for energy storage devices have increased along with the development of power conditioning systems using renewable energy sources. Accordingly, usage of the power conditioning systems including battery energy storage systems has gradually increased and their capacity has also increased.

SUMMARY OF CERTAIN INVENTIVE ASPECTS

One inventive aspect is a power converting system that includes two-way power converting devices arranged in parallel and operates with maximum power efficiency by comparing an actual power efficiency with a previous power efficiency to adjust an amount of an input current.

Another aspect is a method of controlling the power converting system.

Another aspect is a power converting system including a first power converting device and a second power converting device connected in parallel, the power converting system including: a current control unit that determines a first efficiency of the power converting system and modifies an amount of a first current and an amount of a second current in one of a first mode and a second mode, the amount of the first current input to the first power converting device and the amount of the second current input to the second power converting device being respectively adjusted in the first mode and the second mode, determines a second efficiency, and determines the first mode or the second mode as a current adjustment mode according to a result of comparing the first efficiency and the second efficiency; and a current distributing unit that distributes the amount of the first current and the amount of the second current according to the determined current adjustment mode.

The first mode can be a mode in which the amount of the first current input to the first power converting device is increased and the amount of the second current input to the second power converting device is reduced.

The second mode can be a mode in which the amount of the first current input to the first power converting device is reduced and the amount of the second current input to the second power converting device is increased.

If the second efficiency is smaller than the first efficiency, the current control unit can modify the current adjustment mode from one of the first mode and the second mode to the other mode.

If the second efficiency is greater than the first efficiency, the current control unit can maintain the current adjustment mode as one of the first mode and the second mode.

The current control unit can periodically determine the current adjustment mode, and the current distributing unit can distribute an amount of the first current and an amount of the second current according to the determined current adjustment mode.

Another aspect is a method of controlling a power converting system including a first power converting device and a second power converting device connected in parallel, includes: determining a first efficiency of the power converting system; modifying an amount of a first current and an amount of a second current in one of a first mode and a second mode the amount of the first current input to the first power converting device and the amount of the second current input to the second power converting device being respectively adjusted in the first mode and the second mode, and determining a second efficiency of the power converting system; comparing the first efficiency with the second efficiency and determining the first mode or the second mode as a current adjustment mode according to a result of the comparing; and modifying the amount of the first current and the amount of the second current according to the determined current adjustment mode.

The determining of the first mode or the second mode as the current adjustment mode can include, if the second efficiency is greater than the first efficiency, changing the current adjustment mode from one of the first mode and the second mode to the other mode.

The determining of the first mode or the second mode as the current adjustment mode can include, if the second efficiency is smaller than the first efficiency, maintaining one of the first mode and the second mode as the current adjustment mode.

The method can further include repeatedly performing the determining of the first mode or the second mode as the current adjustment mode and the modifying of the amount of the first current and the amount of the second current.

Another aspect is a power converting system comprising first and second power converters electrically connected to each other. The power converting system also comprises a current controller configured to i) determine first and second efficiencies of the power converting system, ii) modify an amount of a first current configured to flow into the first power converter and an amount of a second current configured to flow into the second power converter in one of a first mode and a second mode, iii) compare the first efficiency to the second efficiency, and iv) determine the first mode or the second mode as a current adjustment mode based at least in part on the comparison result. The power converting system also comprises a current distributor configured to distribute the amounts of the first and second currents based at least in part on the determined current adjustment mode.

In the above system, in the first mode, the current controller is further configured to increase the amount of the first current and decrease the amount of the second current.

In the above system, in the second mode, the current controller is further configured to reduce the amount of the first current and increase the amount of the second current.

In the above system, if the second efficiency is less than the first efficiency, the current controller is further configured to modify the current adjustment mode from one of the first and second modes to the other mode.

In the above system, if the second efficiency is greater than the first efficiency, the current controller is further configured to maintain the current adjustment mode.

In the above system, the current controller is further configured to substantially periodically determine the current adjustment mode, wherein the current distributor is further configured to distribute the amounts of the first and second currents based at least in part on the determined current adjustment mode.

In the above system, each of the first and second power converters includes an input power and an output power, wherein the first and second efficiencies respectively include ratios of the output powers to the input powers of the first and second power converters.

In the above system, the current controller comprises an efficiency calculator configured to calculate the first and second efficiencies, an efficiency information memory configured to store the first efficiency, a comparator configured to compare the first and second efficiencies, and a current adjuster configured to generate a current adjustment factor based at least in part on the comparison result.

Another aspect is a method of controlling a power converting system comprising first and second power converters electrically connected to each other, the method comprising determining a first efficiency of the power converting system and modifying an amount of a first current flowing into the first power converter and an amount of a second current flowing into the second power converter in one of a first mode and a second mode. The method also comprises determining a second efficiency of the power converting system, comparing the first efficiency to the second efficiency, determining the first or second mode as a current adjustment mode based at least in part on the comparison, and modifying the amounts of the first and second currents based at least in part on the determined current adjustment mode.

In the above method, the determining of the first or second mode as the current adjustment mode comprises changing the current adjustment mode from one of the first and second modes to the other mode if the second efficiency is greater than the first efficiency.

In the above method, the determining of the first or second mode as the current adjustment mode comprises maintaining the current adjustment mode if the second efficiency is smaller than the first efficiency.

The above method further comprises repeatedly performing i) the determining of the first or second mode as the current adjustment mode and ii) the modifying.

In the above method, each of the first and second power converters includes an input power and an output power, and wherein the first and second efficiencies respectively include ratios of the output powers to the input powers of the first and second power converters.

Another aspect is a power converting system comprising first and second power converters electrically connected to each other and a current controller electrically connected to the first and second power converters. The current controller comprises an efficiency calculator configured to calculate first and second efficiencies of the power converting system, an efficiency information memory configured to store the first efficiency, a comparator configured to compare the first and second efficiencies, and a current adjuster configured to generate a current adjustment factor based at least in part on the comparison result. The system also comprises a current distributor configured to respectively distribute first and second currents to the first and second power converters based at least in part on the current adjustment factor.

In the above system, each of the first and second power converters includes input power and output power, and wherein the first and second efficiencies respectively include ratios of the output powers to the input powers of the first and second power converters.

In the above system, in a first mode, the current controller is configured to increase the amount of the first current and reduce the amount of the second current.

In the above system, in a second mode, the current controller is further configured to reduce the amount of the first current and increase the amount of the second current.

In the above system, if the second efficiency is less than the first efficiency, the current controller is further configured to change the mode from one of the first and second modes to the other mode.

In the above system, if the second efficiency is greater than the first efficiency, the current controller is further configured to maintain the first or second mode.

In the above system, the current controller is further configured to substantially periodically determine the first or second mode, wherein the current distributor is further configured to distribute the amounts of the first and second currents based at least in part on the determined mode.

DETAILED DESCRIPTION OF CERTAIN INVENTIVE EMBODIMENTS

Figure 1:
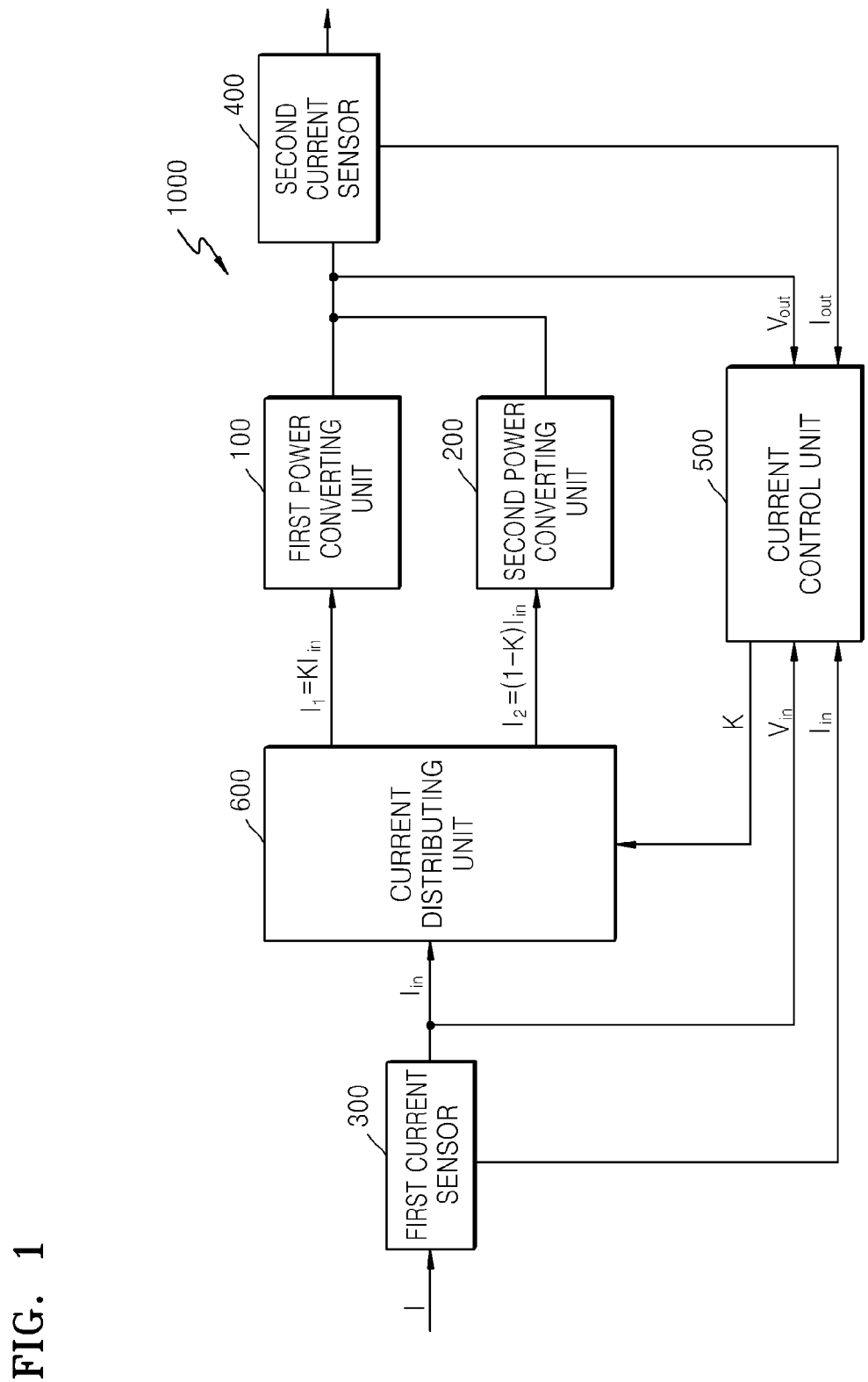
FIG. 1 illustrates a power converting system according to an embodiment.

Power converters are generally driven in parallel with battery energy storage systems, thereby increasing their stability and allowing easy extensions thereof. However, when driven with power at low-capacity, the efficiency of the devices can be reduced.

Reference will now be made in detail to embodiments, examples of which are illustrated in the accompanying drawings, wherein like reference numerals refer to like elements throughout and repeated description related thereto will be omitted. In this regard, the present embodiments can have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The advantages and features of the described technology and methods of achieving the advantages and features will be described more fully with reference to the accompanying drawings, in which exemplary embodiments are shown. The described technology can, however, be embodied in many different forms and should not be construed as being limited to the embodiments set forth herein; and it is to be appreciated that all changes, equivalents, and substitutes that do not depart from the spirit and technical scope of the described technology are encompassed in the described technology. These embodiments are provided so that this disclosure will be thorough and complete, and will fully convey the concept of the described technology to one of ordinary skill in the art. In the description, certain detailed explanations of related art are omitted when it is deemed that they can unnecessarily obscure the essence of the described technology.

Meanwhile, the terminology used herein is for the purpose of describing particular embodiments only and is not intended to be limiting of exemplary embodiments. As used herein, the singular forms "a," "an," and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. can be used herein to describe various elements, these elements should not be limited by these terms. These terms are only used to distinguish one element from another. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 illustrates a power converting system 1000 according to an embodiment. Depending on the embodiment, certain elements can be removed from or additional elements can be added to the system illustrated in FIG. 1. Furthermore, two or more elements can be combined into a single element, or a single element can be realized as multiple elements. Each of the elements of FIG. 1 can be implemented as a hardware and/or a software module. This applies to the embodiments of FIGS. 2-3.

Referring to FIG. 1, the power converting system 1000 includes a first power converting unit or first power converter 100, a second power converting unit or second power converter 200, a first current sensor 300, a second current sensor 400, a current control unit or current controller 500, and a current distributing unit or current distributor 600.

The first power converting unit 100 and the second power converting unit 200 can convert an input power to another power and output the same. According to the present embodiment, the first power converting unit 100 is electrically connected to the second power converting unit 200 in parallel. The first and second power converting units 100 and 200 can include power converting circuits according to a type of the input power, such as a converter circuit or a rectifying circuit. If the input power is direct current (DC) power, the first and second power converting units 100 and 200 can include a DC-DC converter circuit that converts the DC power to other DC power or an inverter circuit that converts the DC power to alternating current (AC) power. If AC power is output, at least one of the power converting units 100 and 200 can include a rectifying a circuit that converts AC power to DC power.

The current control unit 500 can sense an input current ($I_{in}$) that flows into the power converting system 1000 by using the first current sensor 300. The current control unit 500 can sense an output current ($I_{out}$) that flows out from the power converting system 1000 by using the second current sensor 400. The current control unit 500 can sense an input voltage ($V_{in}$) and an output voltage ($V_{out}$) of the power converting system 1000.

The current control unit 500 can determine an input power based on the input current ($I_{in}$) and the input voltage ($V_{in}$). The current control unit 500 can determine an output power based at least in part on the output current ($I_{out}$) and the output voltage ($V_{out}$). The current control unit 500 can determine an efficiency of the power converting system 1000. The efficiency can represent a ratio of the output power to the input power. The current control unit 500 can compare a first efficiency as a previous efficiency with a second efficiency as an actual efficiency. The current control unit 500 can perform a maximum efficiency point tracking (MEPT) control whereby an amount of a first current ($I_1$) input to the first power converting unit 100 and an amount of a second current ($I_2$) input to the second power converting unit 200 are adjusted so that the power converting system 1000 can operate at substantially the maximum efficiency point based at least in part on the comparison result. The current control unit 500 can output a current control factor or current adjustment factor K whereby the amounts of the first and second currents ($I_1$) and ($I_2$) are adjusted. Hereinafter, an example operation of the current control unit 500 will be described with reference to FIG. 2.

The current distributing unit 600 distributes the amounts of the first and second currents ($I_1$) and ($I_2$) based at least in part on the current adjustment factor K output from the current control unit 500.

Figure 2:
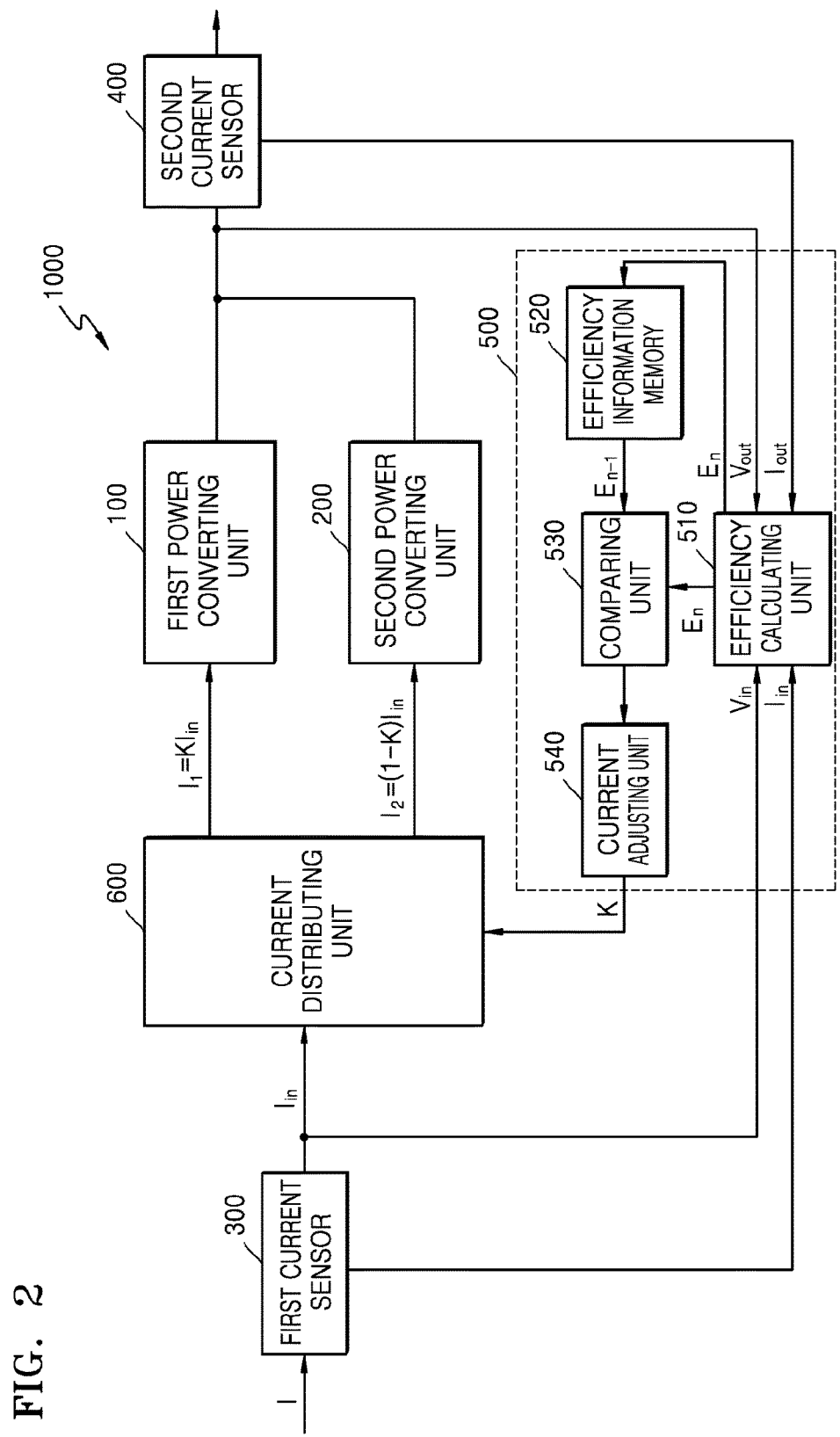
FIG. 2 is a detailed diagram of a current control unit of the power converting system according to an embodiment.

FIG. 2 is a detailed diagram of the current control unit 500 of the power converting system 1000 according to an embodiment.

Referring to FIG. 2, the current control unit 500 includes an efficiency calculating unit or efficiency calculator 510, an efficiency storage unit or efficiency information memory 520, a comparing unit or comparator 530, and a current adjusting unit or current adjuster 540.

The efficiency calculating unit 510 can calculate an actual efficiency ($E_n$) indicating a ratio of output power that is determined based at least in part on the output current ($I_{out}$) and the output voltage ($V_{out}$) with respect to the input power determined based at least in part on the input current ($I_{in}$) and the input voltage ($V_{in}$). The actual efficiency ($E_n$) can be stored in the efficiency storage unit 520 and then can be used as a first efficiency ($E_{n-1}$), that is, a previous efficiency, when comparing efficiencies.

The efficiency calculating unit 510 can modify amounts of the first and second currents ($I_1$) and ($I_2$) according to one of current adjustment modes. The current adjustment modes can include a first mode and a second mode. The efficiency calculating unit 510 can calculate the actual efficiency ($E_n$) indicating the ratio of the output current ($I_{out}$) and the output voltage ($V_{out}$) flowing out from the power converting system 1000 with respect to the input current ($I_{in}$) and the input voltage ($V_{in}$) flowing into the power converting system 1000. The actual efficiency ($E_n$) can be used as the second efficiency ($E_n$) when comparing efficiencies.

In the first mode, the amount of the first current ($I_1$) can be increased by a predetermined amount, and the amount of the second current ($I_2$) can be reduced by a predetermined amount. In the second mode, the amount of the first current ($I_1$) can be reduced by a predetermined amount, and the amount of the second current ($I_2$) can be increased by a predetermined amount.

The comparing unit 530 can compare the first efficiency ($E_{n-1}$) and the second efficiency ($E_n$). The current adjusting unit 540 can determine the first mode or the second mode as a current adjustment mode based at least in part on the comparison result.

According to the comparison result, if the second efficiency ($E_n$) is greater than the first efficiency ($E_{n-1}$), the current adjusting unit 540 can maintain the previous current adjustment mode. On the contrary, if the second efficiency ($E_n$) is less than the first efficiency ($E_{n-1}$), the current adjusting unit 540 can modify the previous current adjustment mode to another mode.

For example, if the previous current adjustment mode is the first mode, and the second efficiency ($E_n$) is greater than the first efficiency ($E_{n-1}$), the current adjusting unit 540 maintains the current adjustment mode as the first mode. In this example, the current adjusting unit 540 can further increase the amount of the first current ($I_1$) input to the first power converting unit 100, and further reduce the amount of the second current ($I_2$) input to the second power converting unit 200. For example, the current adjusting unit 540 outputs a current adjustment factor K whereby a previous current adjustment factor is increased by a predetermined size (for example, by about 0.01).

In some embodiments, if the second efficiency ($E_n$) is less than the first efficiency ($E_{n-1}$), the current adjusting unit 540 modifies the current adjustment mode from the first mode, which is the previous current adjustment mode, to the second mode. In some embodiments, the current adjusting unit 540 reduces the amount of the first current ($I_1$) input to the first power converting unit 100, and increases the amount of the second current ($I_2$) input to the second power converting unit 200. For example, the current adjusting unit 540 outputs a current adjustment factor K whereby the previous current adjustment factor is reduced by a predetermined size (for example, by about 0.01).

In some embodiments, if the second efficiency ($E_n$) is substantially the same as the first efficiency ($E_{n-1}$), the current adjusting unit 540 is set to modify the current adjustment mode from the first mode, which is the previous current adjustment mode, to the second mode. However, if the second efficiency ($E_n$) is different from the first efficiency ($E_{n-1}$), the current adjusting unit 540 is set to not modify the current adjustment mode.

Determining the first mode or the second mode and adjusting the amounts of the first current ($I_1$) and the second current ($I_2$) according to the determined mode as described above can be repeatedly performed until the power converting system 1000 stops operating.

The current distributing unit 600 distributes the amount of the first current ($I_1$) and the amount of the second current ($I_2$) based at least in part on the current adjustment factor K output from the current control unit 500. For example, the current distributing unit 600 determines a first current adjustment factor ($K_1$) and a second current adjustment factor ($K_2$) based at least in part on the current adjustment factor K. The sum of the first current adjustment factor ($K_1$) and the second current adjustment factor ($K_2$) can be 1. For example, the current distributing unit 600 determines the first current adjustment factor ($K_1$) as the current adjustment factor (K) and the second current adjustment factor ($K_2$) as 1-current adjustment factor (that is, 1-K).

If the second efficiency ($E_n$) is greater than the first efficiency ($E_{n-1}$), the current adjusting unit 540 can maintain the previous current adjustment mode. For example, if the previous current adjustment mode is the first mode, the current adjusting unit 540 further increases the current adjustment factor K by a predetermined size (for example, by about 0.01) in order to further increase the amounts of the first and second currents ($I_1$) and ($I_2$). The current distributing unit 600 can receive a new current adjustment factor K which is increased by the predetermined size. The current distributing unit 600 can determine, based at least in part on the new current adjustment factor K, i) a new first current adjustment factor ($K_1$) that is greater by the predetermined size (for example, by about 0.01) than the previous first current adjustment factor ($K_2$) and ii) a new second current adjustment factor ($K_2$) that is less than the previous second current adjustment factor ($K_2$) by the predetermined size (for example, by about 0.01). The current distributing unit 600 can output the first current ($I_1$), corresponding to a multiplication of the new first current adjustment factor ($K_1$) by the input current ($I_{in}$) to the first power converting unit 100, and the second current ($I_2$), corresponding to a multiplication of the new second current adjustment factor ($K_2$) by the input current ($I_{in}$) to the second power converting unit 200.

However, if the second efficiency ($E_n$) is less than the first efficiency ($E_{n-1}$), the current adjusting unit 540 can modify the previous current adjustment mode to another mode. For example, if the previous current adjustment mode is the first mode, the current adjusting unit 540 modifies the current adjustment mode to the second mode. The current adjusting unit 540 can further reduce the current adjustment factor K by a predetermined size (for example, by about 0.01) in order to further reduce the amount of the first current ($I_1$) and to further increase the amount of the second current ($I_2$). The current distributing unit 600 can receive a new current adjustment factor K which is reduced by the predetermined size. The current distributing unit 600 can determine, based at least in part on the new current adjustment factor K, i) a new first current adjustment factor ($K_1$) that is less by the predetermined size (for example, by about 0.01) than the previous first current adjustment factor ($K_1$) and ii) a new second current adjustment factor ($K_2$) that is greater than the previous second current adjustment factor ($K_2$) by the predetermined size (for example, by about 0.01). The current distributing unit 600 can output the first current ($I_1$), corresponding to a multiplication of the new first current adjustment factor ($K_1$) by the input current ($I_{in}$) to the first power converting unit 100, and the second current ($I_2$), corresponding to a multiplication of the new second current adjustment factor ($K_2$) by the input current ($I_{in}$) to the second power converting unit 200.

Figure 3:
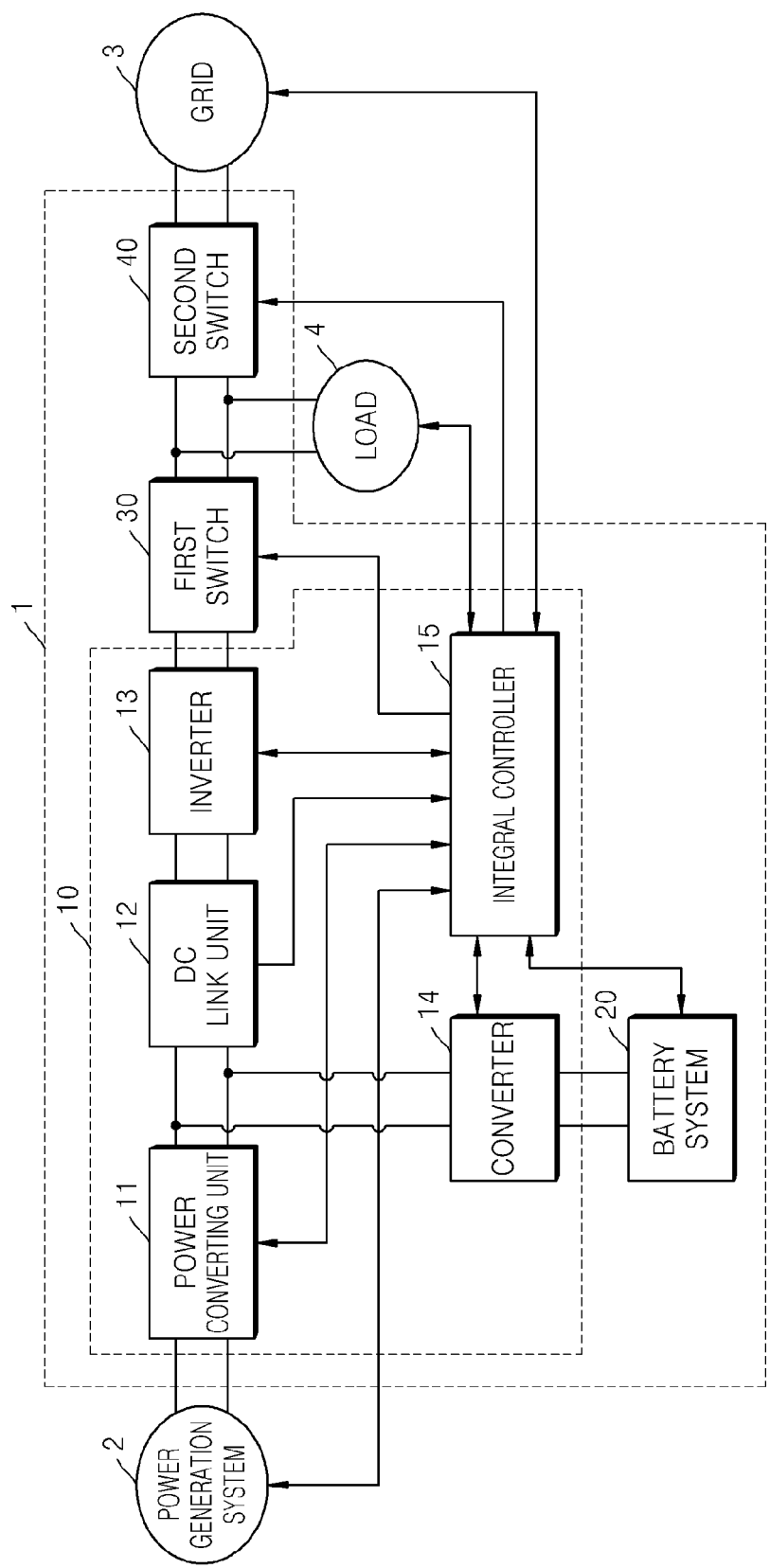
FIG. 3 illustrates an energy storage system according to an embodiment.

FIG. 3 illustrates an energy storage system 1 according to an embodiment.

Referring to FIG. 3, the energy storage system 1 includes a power converting system (PCS) 10, a battery system 20, a first switch 30, and a second switch 40.

The PCS 10 can convert power provided from a power generation system 2, a grid 3, and/or the battery system 20 to other appropriate types of power and supply the same to a load 4, the battery system 20, and/or the grid 3. The PCS 10 can include a power converting unit or power converter 11, a DC link unit 12, an inverter 13, a converter 14, and an integral controller 15.

The power converting unit 11 can be a power converting device electrically connected between the power generation system 2 and the DC link unit 12. The power converting unit 11 can convert power produced by the power generation system 2 to a DC link voltage and transfer the DC link voltage to the DC link unit 12. The power converting unit 11 can include a power converting circuit based at least in part on a type of the power generation system 2, such as a converter circuit or a rectifying circuit. If the power generation system 2 produces DC power, the power converting unit 11 can include a DC-DC converter circuit that converts DC power to other DC power or an inverter circuit that converts DC power to alternating current (AC) power. If the power generation system 2 produces AC power, the power converting unit 11 can include a rectifying a circuit that converts the AC power to DC power.

The power converting unit 11 can include the first and second power converting units 100 and 200 that are electrically connected in parallel (described with reference to FIGS. 1 and 2), the first current sensor 300, the second current sensor 400, the current control unit 500, and the current distributing unit 600.

If the power generation system 2 is a solar light generation system, the power converting unit 11 can include a maximum power point tracking (MPPT) converter that performs MPPT control so as to obtain substantially maximum power that is produced by the power generation system 2 based at least in part on changes in an amount of solar radiation, temperature, or the like. Also, if no power is produced by the power generation system 2, operation of the power converting unit 11 is stopped to thereby minimize or reduce power consumed by the power converting devices such as a converter circuit or a rectifying circuit.

A level of a DC link voltage can become unstable due to, for example, an instantaneous voltage drop in the power generation system 2 or the grid 3 or a peak load generated in the load 4. In some embodiments, a DC link voltage has to be stabilized for a normal operation of the converter 14 and the inverter 13. The DC link unit 12 can be electrically connected between the power converting unit 11, the inverter 13, and the converter 14 so as to maintain a DC link voltage uniformly or substantially uniformly. The DC link unit 12 can include, for example, a large-sized capacitor.

The inverter 13 can be a power converting device electrically connected between the DC link unit 12 and the first switch 30. The inverter 13 can include an inverter that converts a DC link voltage provided by at least one of the power generation system 2 and the battery system 20 to an AC voltage of the grid and outputs the AC voltage. Also, the inverter 13 can include a rectifying circuit that converts an AC voltage provided by the grid 3 to a DC link voltage and outputs the DC link voltage in order to store power of the grid 3 in the battery system 20 in a charging mode. The inverter 13 can be a two-way inverter whose input and output directions can be changed.

The inverter 13 can include a filter that removes harmonics from an AC voltage output through the grid 3. Also, the inverter 13 can include a phase-locked loop (PLL) that synchronizes a phase of an AC voltage output through the inverter 13 and a phase of an AC voltage of the grid 3. Also, the inverter 13 can perform functions such as limiting a voltage fluctuation range, improvement of a power factor, removing of a DC component, or protecting or reducing transient phenomena. The inverter 13 can have a structure like the power converting system 1000 illustrated in FIGS. 1 and 2.

The converter 14 can be a power converting device electrically connected between the DC link unit 12 and the battery system 20. The converter 14 can include a DC-DC converter that performs DC-DC conversion whereby power stored in the battery system 20 in a discharging mode is converted to a DC link voltage. Also, the converter 14 can include a DC-DC converter that performs, in a charging mode, DC-DC conversion on a DC link voltage output through the power converting unit 11 and/or a DC link voltage output through the inverter 13 so as to convert the same to a DC voltage having an appropriate voltage level (e.g., a charging voltage level required by the battery system 20). The converter 14 can be a two-way converter whose input and output directions can change. When charging or discharging of the battery system 20 is not performed, operation of the converter 14 can be stopped to thereby minimize or reduce power consumption. Also, the converter 14 can have the structure of the power converting system 1000 illustrated in FIGS. 1 and 2.

The integral controller 15 can monitor states of the power generation system 2, the grid 3, the battery system 20, and the load 4. For example, the integral controller 15 monitors whether a power failure occurred in the grid 3, whether power is produced by the power generation system 2, an amount of power produced by the power generation system 2, a charging state of the battery system 20, a power consumption amount of the load 4, or power consumption time.

The integral controller 15 can control operations of the power converting unit 11, the inverter 13, the converter 14, the battery system 20, the first switch 30, and the second switch 40 based at least in part on a monitoring result and a preset algorithm. For example, if a power failure occurs in the grid 3, the integral controller 15 operates such that power stored in the battery system 20 or power produced by the power generation system 2 is supplied to the load 4. Also, the integral controller 15 can determine priorities of the electronic devices of the load 4 and control the load 4 such that power is first supplied to the electronic devices having higher priorities if sufficient power is not to be supplied to the load 4. Also, the integral controller 15 can control charging and discharging of the battery system 20.

The first switch 30 and the second switch 40 are electrically connected in series between the inverter 13 and the grid 3. The first and second switches 30 and 40 can perform a short circuit operation and an opening operation based at least in part on a control of the integral controller 15 to control a current flow between the power generation system 2 and the grid 3. Short circuit and opening states of the first switch 30 and the second switch 40 can be determined based at least in part on states of the power generation system 2, the grid 3, and the battery system 20. For example, when supplying power from at least one of the power generation system 2 and the battery system 20 to the load 4 or power from the grid 3 to the battery system 20, the first switch 30 is in a short-circuit state. When supplying power from at least one of the power generation system 2 and the battery system 20 to the grid 3 or power from the grid 3 to at least one of the load 4 and the battery system 20, the second switch 40 is in a short-circuit state.

When a power failure has occurred in the grid 3, the second switch 40 is in an opened state, and the first switch 30 is in a short-circuit state. That is, power is supplied from at least one of the power generation system 2 and the battery system 20 to the load 4, and at substantially the same time, the power that is supplied to the load 4 is prevented from flowing to the grid 3. As described above, by operating the energy storage system 1 as a stand-alone system, an electric shock to a person who works on a power line of the grid 3, for example, due to power transmitted from the power generation system 2 or the battery system 20, can be prevented.

The first switch 30 and the second switch 40 can include a switching device such as a relay, which is capable of resisting a high current or processing a high current.

The battery system 20 can receive power from at least one of the power generation system 2 and the grid 3, and supply the power to at least one of the load 4 and the grid 3.

Figure 4:
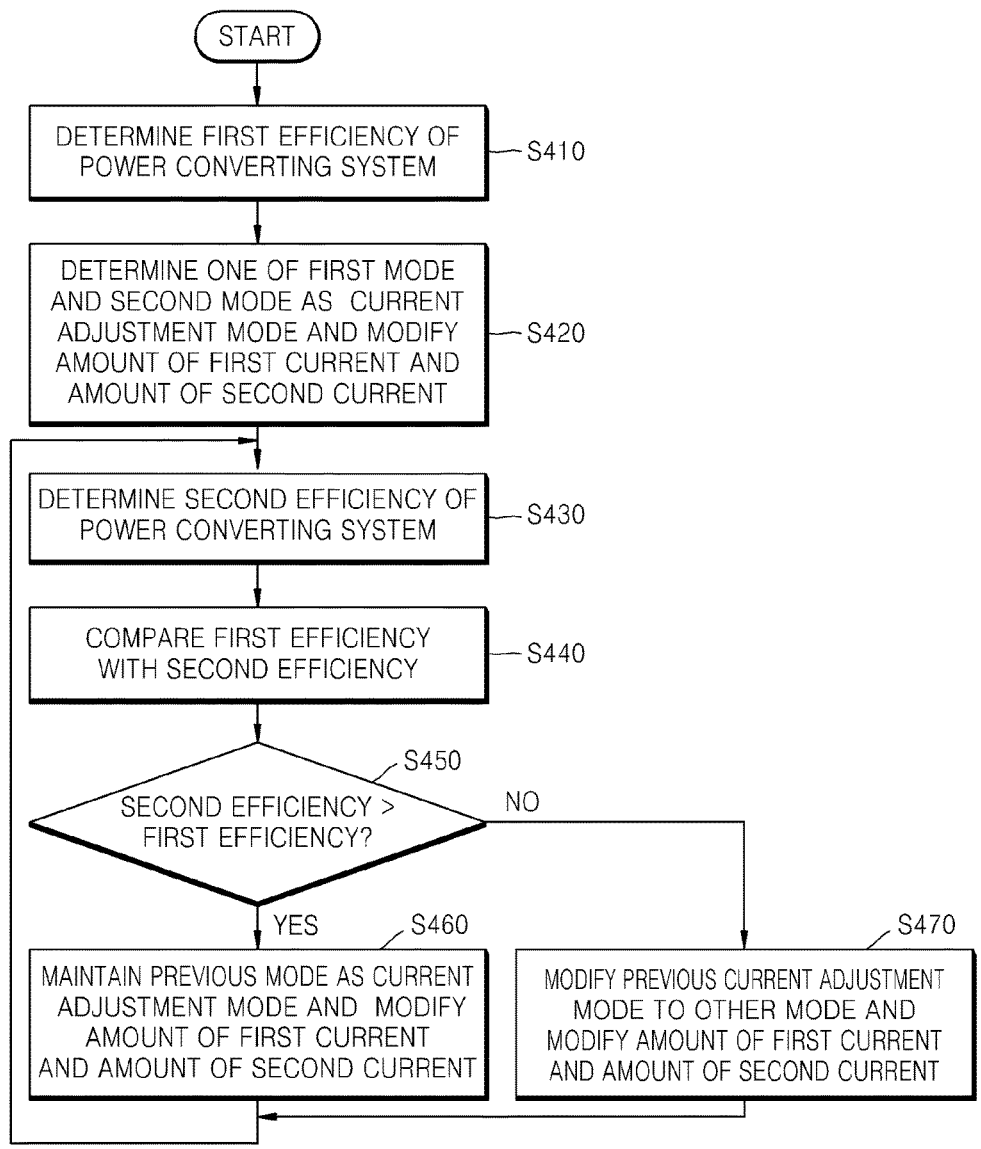
FIG. 4 is a flowchart of a method of controlling a power converting system according to an embodiment.

FIG. 4 is a flowchart of a method of controlling the power converting system 1000 according to an embodiment.

Referring to FIG. 4, the power converting system 1000 determines a first efficiency ($E_{n-1}$) indicating a ratio of output power determined based at least in part on output current ($I_{out}$) and output voltage ($V_{out}$) with respect to input power determined based on input current ($I_{in}$) and input voltage ($V_{in}$) (S410).

In some embodiments, the FIG. 4 procedure is implemented in a conventional programming language, such as C or C++ or another suitable programming language. The program can be stored on a computer accessible storage medium of the power converting system 1000, for example, a memory (not shown) of the power converting system 1000 or the current control unit 500. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 4.

After determining the first efficiency ($E_{n-1}$), the power converting system 1000 can determine one of a first mode and a second mode as a current adjustment mode and modify an amount of a first current ($I_1$) and an amount of a second current ($I_2$) (S420). The first mode can be a mode in which the amount of the first current ($I_1$) is increased by a predetermined amount, and the amount of the second current ($I_2$) is reduced by a predetermined amount. Also, the second mode can be a mode in which the amount of the first current ($I_1$) is reduced by a predetermined amount, and the amount of the second current ($I_2$) is increased by a predetermined amount.

After the amount of the first current and the amount of the second current are modified, the power converting system 1000 determines a second efficiency ($E_n$) indicating a ratio of output power determined based on output current ($I_{out}$) and output voltage ($V_{out}$) with respect to input power determined based on input current (4) and input voltage ($V_{in}$) (S430).

The power converting system 1000 compares the first efficiency ($E_{n-1}$) with the second efficiency ($E_n$) (S440), and determines whether the second efficiency ($E_n$) is greater than the first efficiency ($E_{n-1}$).

Based at least in part on a comparison result, if the second efficiency ($E_n$) is greater than the first efficiency ($E_{n-1}$), the power converting system 1000 maintains a previous current adjustment mode, and modifies the amount of the first current ($I_1$) input to the first power converting unit 100 and the amount of the second current ($I_1$) input to the second power converting unit 200 (S460).

For example, if the previous current adjustment mode is the first mode, the power converting system 1000 maintains the first mode as the current adjustment mode. In this example, the power converting system 1000 further increases the amount of the first current ($I_1$) and further reduces the amount of the second current ($I_2$). For example, the power converting system 1000 outputs a current adjustment factor K whereby a previous current adjustment factor is increased by a predetermined size (for example, by about 0.01). For example, if the previous current adjustment mode is the second mode, the power converting system 1000 maintains the second mode as the current adjustment mode.

In this example, the power converting system 1000 further reduces the amount of the first current input to the first power converting unit 100 and further increases the amount of the second current input to the second power converting unit 200. For example, the power converting system 1000 outputs a current adjustment factor K whereby a previous current adjustment factor is reduced by a predetermined size (for example, by about 0.01).

However, if the second efficiency ($E_n$) is less than the first efficiency ($E_{n-1}$) based at least in part on the comparison result, the power converting system 1000 modifies the current adjustment mode to a different mode, and modifies the amount of the first current ($I_1$) and the amount of the second current ($I_2$) (S470).

For example, if the previous current adjustment mode is the first mode, the power converting system 1000 modifies the current adjustment mode to the second mode. The power converting system 1000 can reduce the current adjustment factor K by a predetermined size (for example, by about 0.01) in order to reduce the amount of the first current ($I_1$) and increase the amount of the second current ($I_2$). For example, if the previous current adjustment mode is the second mode, the power converting system 1000 modifies the current adjustment mode to the first mode. The power converting system 1000 can increase the current adjustment factor K by a predetermined size (for example, by about 0.01) in order to increase the amount of the first current ($I_1$) and reduce the amount of the second current ($I_2$).

According to the present embodiment, if the second efficiency ($E_n$) is substantially the same as the first efficiency ($E_{n-1}$) based at least in part on the comparison result, the power converting system 1000 is set to modify the current adjustment mode from the first mode, which is the previous current adjustment mode, to the second mode. However, if the second efficiency ($E_n$) is substantially not the same as the first efficiency ($E_{n-1}$), the power converting system 1000 can be set not to modify the current adjustment mode.

As described above, by comparing the first efficiency ($E_{n-1}$) and the second efficiency ($E_n$), the current adjustment mode can be maintained as the first mode or the second mode or be modified from the first mode to the second mode or from the second mode to the first mode and allow the power converting system 1000 to operate near a maximum efficiency point via repeated operations of adjusting the amount of the first current ($I_1$) and the amount of the second current ($I_2$).

As described above, according to at least one of the disclosed embodiments, an actual power efficiency of a power converting system that includes two-way power converting devices arranged in parallel is compared with a previous power efficiency to adjust an amount of an input current flowing to each of the power converting devices. This reduces a decrease in the power efficiency of the power converting system and allows the power converting system to operate with substantially maximum power efficiency.

The particular implementations shown and described herein are illustrative examples of the inventive technology and are not intended to otherwise limit the scope of the inventive technology in any way. For the sake of brevity, conventional electronics, control systems, software development and other functional aspects of the systems are not described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections can be present in a practical device. Moreover, no item or component is essential to the practice of the described technology unless the element is specifically described as "essential" or "critical".

The use of the terms "a" and "an" and "the" and similar referents in the context of describing the inventive technology (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the inventive technology and does not pose a limitation on the scope of the inventive technology unless otherwise claimed. Numerous modifications and adaptations will be readily apparent to those skilled in this art without departing from the spirit and scope of the inventive technology.

It should be understood that the exemplary embodiments described therein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details can be made therein without departing from the spirit and scope of the inventive technology as defined by the following claims.

What is claimed is:

1. A power converting system comprising:
   first and second power converters electrically connected to each other;
   a current controller configured to i) determine first and second efficiencies of the power converting system, ii) modify an amount of a first current configured to flow into the first power converter and an amount of a second current configured to flow into the second power converter in one of a first mode and a second mode, iii) compare the first efficiency to the second efficiency, and iv) determine the first mode or the second mode as a current adjustment mode based at least in part on the comparison result; and
   a current distributor configured to distribute the amounts of the first and second currents based at least in part on the determined current adjustment mode.

2. The power converting system of claim 1, wherein, in the first mode, the current controller is further configured to increase the amount of the first current and decrease the amount of the second current.

3. The power converting system of claim 1, wherein, in the second mode, the current controller is further configured to reduce the amount of the first current and increase the amount of the second current.

4. The power converting system of claim 1, wherein, if the second efficiency is less than the first efficiency, the current controller is further configured to modify the current adjustment mode from one of the first and second modes to the other mode.

5. The power converting system of claim 1, wherein, if the second efficiency is greater than the first efficiency, the current controller is further configured to maintain the current adjustment mode.

6. The power converting system of claim 1, wherein the current controller is further configured to substantially periodically determine the current adjustment mode, and wherein the current distributor is further configured to distribute the amounts of the first and second currents based at least in part on the determined current adjustment mode.

7. The power converting system of claim 1, wherein each of the first and second power converters includes an input power and an output power, and wherein the first and second efficiencies respectively include ratios of the output powers to the input powers of the first and second power converters.

8. The power converting system of claim 1, wherein the current controller comprises:
   an efficiency calculator configured to calculate the first and second efficiencies;
   an efficiency information memory configured to store the first efficiency;
   a comparator configured to compare the first and second efficiencies; and
   a current adjuster configured to generate a current adjustment factor based at least in part on the comparison result.

9. The power converting system of claim 1, wherein at least one of the first and second efficiencies includes a ratio of output power to input power of the power converting system.

10. A method of controlling a power converting system comprising first and second power converters electrically connected to each other, the method comprising:
    determining a first efficiency of the power converting system;
    modifying an amount of a first current flowing into the first power converter and an amount of a second current flowing into the second power converter in one of a first mode and a second mode,
    determining a second efficiency of the power converting system;
    comparing the first efficiency to the second efficiency;
    determining the first or second mode as a current adjustment mode based at least in part on the comparison; and
    modifying the amounts of the first and second currents based at least in part on the determined current adjustment mode.

11. The method of claim 10, wherein the determining of the first or second mode as the current adjustment mode comprises changing the current adjustment mode from one of the first and second modes to the other mode if the second efficiency is greater than the first efficiency.

12. The method of claim 10, wherein the determining of the first or second mode as the current adjustment mode comprises maintaining the current adjustment mode if the second efficiency is smaller than the first efficiency.

13. The method of claim 10, further comprising repeatedly performing i) the determining of the first or second mode as the current adjustment mode and ii) the modifying.

14. The power converting system of claim 10, wherein each of the first and second power converters includes an input power and an output power, and wherein the first and second efficiencies respectively include ratios of the output powers to the input powers of the first and second power converters.

15. A power converting system comprising:
first and second power converters electrically connected to each other;
a current controller electrically connected to the first and second power converters, wherein the current controller comprises:
an efficiency calculator configured to calculate first and second efficiencies of the power converting system;
an efficiency information memory configured to store the first efficiency;
a comparator configured to compare the first and second efficiencies; and
a current adjuster configured to generate a current adjustment factor based at least in part on the comparison result; and
a current distributor configured to respectively distribute first and second currents to the first and second power converters based at least in part on the current adjustment factor.

16. The power converting system of claim 15, wherein each of the first and second power converters includes input power and output power, and wherein the first and second efficiencies respectively include ratios of the output powers to the input powers of the first and second power converters.

17. The power converting system of claim 15, wherein, in a first mode, the current controller is configured to increase the amount of the first current and reduce the amount of the second current.

18. The power converting system of claim 17, wherein, in a second mode, the current controller is further configured to reduce the amount of the first current and increase the amount of the second current.

19. The power converting system of claim 18, wherein, if the second efficiency is less than the first efficiency, the current controller is further configured to change the mode from one of the first and second modes to the other mode.

20. The power converting system of claim 19, wherein, if the second efficiency is greater than the first efficiency, the current controller is further configured to maintain the first or second mode.

21. The power converting system of claim 17, wherein the current controller is further configured to substantially periodically determine the first or second mode, and wherein the current distributor is further configured to distribute the amounts of the first and second currents based at least in part on the determined mode.

* * * * *